United States Patent
Freijedo Fernández et al.

(10) Patent No.: US 12,483,110 B2
(45) Date of Patent: Nov. 25, 2025

(54) POWER SHARING REGULATION FOR SOLID STATE TRANSFORMER BY EMBEDDED DIGITAL EQUALIZATION

(71) Applicant: Huawei Digital Power Technologies Co., Ltd., Shenzhen (CN)

(72) Inventors: Francisco Daniel Freijedo Fernández, Nuremberg (DE); Piniwan Thiwanka Bandara Wijekoon, Nuremberg (DE)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 18/352,703

(22) Filed: Jul. 14, 2023

(65) Prior Publication Data

US 2023/0361571 A1  Nov. 9, 2023

Related U.S. Application Data

(63) Continuation of application No. PCT/EP2021/050834, filed on Jan. 15, 2021.

(51) Int. Cl.
*H02M 1/00* (2007.01)
*H02M 3/335* (2006.01)
(Continued)

(52) U.S. Cl.
CPC ......... *H02M 1/0025* (2021.05); *H02M 1/007* (2021.05); *H02M 1/0074* (2021.05);
(Continued)

(58) Field of Classification Search
CPC .. H02M 1/0025; H02M 1/007; H02M 1/0074; H02M 1/0077; H02M 3/335;
(Continued)

(56) References Cited

U.S. PATENT DOCUMENTS 8,848,409 B2  9/2014  Dujic et al.
2019/0312521 A1  10/2019  Cao et al.
(Continued)

FOREIGN PATENT DOCUMENTS

JP        4915136 B2     4/2012
WO   WO-2022052916 A1 *  3/2022  ........... H02H 7/1213

OTHER PUBLICATIONS

Machine translation of WO 2022/052916, orig. pub. Mar. 17, 2022. Obtained from internal USPTO database on May 1, 2025. (Year: 2022).*

(Continued)

*Primary Examiner* — Fred E Finch, III
(74) *Attorney, Agent, or Firm* — Conley Rose, P.C.

(57) ABSTRACT

A power electronics multilevel converter comprises one or more phase legs. Each respective phase leg of the one or more phase legs comprises a plurality of cells. Each respective cell of the plurality of cells comprises an alternating current (AC)/direct current (DC) converter, a closed-loop control and a DC/DC converter. The closed-loop control is configured to regulate the cell power transmitted by the AC/DC converter to a DC link of the respective cell in accordance with a cell power reference. The cell power reference depends on a cell voltage reference. The closed-loop control is further configured to adjust the cell voltage reference in dependence of a cell power reference deviation from an average power per cell. The average power per cell depends on the cell power references of the plurality of cells of all phase legs.

20 Claims, 5 Drawing Sheets

(51) Int. Cl.
H02M 7/217 (2006.01)
H02M 7/487 (2007.01)
H02M 5/458 (2006.01)

(52) U.S. Cl.
CPC ...... H02M 3/33569 (2013.01); H02M 5/4585 (2013.01); H02M 7/217 (2013.01); H02M 7/487 (2013.01)

(58) Field of Classification Search
CPC ........... H02M 3/33569–33584; H02M 5/4585; H02M 7/217; H02M 7/219; H02M 7/25; H02M 7/483; H02M 7/487; H02M 7/49
See application file for complete search history.

(56) References Cited

U.S. PATENT DOCUMENTS

| | | | |
|---|---|---|---|
| 2022/0140746 A1* | 5/2022 | Liu | H02J 3/06 363/71 |
| 2023/0402936 A1* | 12/2023 | Farivar | H02M 3/155 |

OTHER PUBLICATIONS

Shien Wang et al., Capacitor Design Optimization and Power Balance Control for LLC Resonant Converter Based Power Electronic Traction Transformer, IEEE Xplore, 2016, 10 pages.

J. Minibock et al., Comparative theoretical and experimental evaluation of bridge leg topologies of a three-phase three- level unity power factor rectifier, 2001 IEEE 32nd Annual Power Electronics Specialists Conference (IEEE Cat. No.01CH37230), Jun. 17-21, 2001, 6 pages.

Tomislav Dragicevic et al., DC Microgrids Part I: A Review of Control Strategies and Stabilization Techniques, IEEE Transactions on Power Electronics, vol. 31, No. 7, Jul. 2016, 16 pages.

Mariam Saeed et al., Energization and Start-Up of CHB-Based Modular Three-Stage Solid-State Transformers, IEEE Transactions on Industry Applications, Sep./Oct. 2018, 10 pages.

J.W. Kolar et al., Vienna rectifier II-a novel single-stage high-frequency isolated three-phase PWM rectifier system, IEEE Transactions on Industrial Electronics, vol. 46, Issue: 4, Aug. 1999, Aug. 1999, 18 pages.

Tiefu Zhao et al., Voltage and Power Balance Control for a Cascaded H-Bridge Converter-Based Solid-State Transformer, IEEE Transactions on Power Electronics, vol. 28, No. 4, Apr. 2013, 10 pages.

Wang Liang et al., Power and Voltage Balance Control of a Novel Three-Phase Solid-State Transformer Using Multilevel Cascaded H-Bridge Inverters for Microgrid Applications, IEEE Transactions on Power Electronics, Institute of Electrical and Electronics Engineers, Apr. 2016, XP011592289, 13 pages.

Xiao Fan et al., Ripple Voltage Suppression and Control Strategy for CHB-Based Solid-State Transformer, IEEE Journal of Emerging and Selected Topics in Power Electronics, IEEE, Dec. 16, 2019, XP011832778, 15 pages.

Iyer Vishnu Mahadeua et al., An Active Damping Control Strategy for a Multi-Cell AC-DC Solid State Transformer, 2020 IEEE Energy Conversion Congress and Exposition(ECCE), IEEE, Oct. 11, 2020, XP033850764, 7 pages.

* cited by examiner

POWER SHARING REGULATION FOR SOLID STATE TRANSFORMER BY EMBEDDED DIGITAL EQUALIZATION

CROSS-REFERENCE TO RELATED APPLICATIONS

This is a continuation of International Patent Application No. PCT/EP2021/050834 filed on Jan. 15, 2021, the disclosure of which is hereby incorporated by reference in its entirety.

TECHNICAL FIELD

The present disclosure generally relates to solid-state transformer (SST)-based electric power conversion, e.g., for data center applications, and in particular to power sharing regulation in input-serial output-parallel (ISOP)-based SST topologies by way of embedded digital equalization. The present disclosure provides, to this end, a power electronics multilevel converter, a method of operating the same and a computer program for carrying out the method by a processor of the converter.

BACKGROUND

SSTs represent a power electronics-based alternative to other line-frequency transformers (LFTs). An SST is based on power electronics switches, sensors, and intelligent controls which collectively facilitate advanced functionalities such as power flow control, reactive power, harmonics, and imbalances compensation, smart protection and ride-through capabilities. Furthermore, a high-frequency switching operation enables a significant reduction of the volume and weight. Some of these features combined may make SST advantageous compared to other LFTs.

SSTs used in data center applications typically interface with medium voltage (MV) alternating current (AC) grids and are often based on multilevel modular converter topologies, which are composed of a plurality of identical but individually controllable power conversion modules or cells. In particular, ISOP-based topologies may be deployed in which the input ports of the plurality of cells are serially connected, so that the MV ratings imposed by the MV AC grid are spread across the cells and translated into low voltage (LV) ratings for the cells and their power electronics switches.

ISOP-based topologies are a prevalent solution for a two-stage power conversion between a MV AC grid and a LV direct current (DC) grid. For example, each cell may include an AC/DC power converter interfacing the MV AC grid connected to a subsequent DC/DC power converter interfacing the LV DC grid. In data center applications, this LV DC hosts the microprocessors system.

The advantages of ISOP topologies imply an increase in complexity both in terms of topology and control, however. A simplification of control may, for example, be achieved by realizing the DC/DC power converter of a respective cell as a series resonant converter (SRC) working in open loop, which implies that the control objectives then have to rely on the AC/DC converter only.

Component tolerances such as leakage inductance of high frequency transformers, DC-link capacitances, resonant tank capacitances, voltage sensors, and the like, may lead to unequal power distribution/sharing among the cells of the SST, which further complicates control of cells.

SUMMARY

In view of the above-mentioned challenges of ISOP systems, it is an object to achieve an active equalization of the power among all the cells of the SST.

This objective is achieved by the embodiments as defined by the appended independent claims. Further embodiments are set forth in the dependent claims and in the following description and drawings.

A first aspect of the present disclosure provides a power electronics multilevel converter comprising one or more phase legs. Each respective phase leg of the one or more phase legs comprises a plurality of cells. Each respective cell of the plurality of cells comprises an AC/DC converter, a closed-loop control and a DC/DC converter. The AC/DC converter is configured to transmit a cell power from an input port to a DC link of the respective cell. The DC link comprises an equivalent capacitor that defines a cell voltage. The closed-loop control is configured to regulate the cell power transmitted by the AC/DC converter to the DC link of the respective cell in accordance with a cell power reference. The cell power reference depends on a cell voltage reference. The DC/DC converter is configured to transmit the cell power from the DC link to an output port of the respective cell. The input ports of the plurality of cells of a respective phase leg are connectable in series between a corresponding AC phase and a neutral point of an AC grid. The output ports of the plurality of cells of all phase legs are connectable in parallel to at least one common DC bus. The closed-loop control of the respective cell is configured to adjust the cell voltage reference in dependence of a cell power reference deviation from an average power per cell. The average power per cell depends on the cell power references of the plurality of cells of all phase legs.

Advantageously, an ability of individual and decoupled control of all the cells of the power electronics multilevel converter may be used to establish different cell voltage references so as to equalize the cell power references (and thus cell powers) among the cells that may have different natural power sharing performance. Benefits of compensating a tolerance-related power imbalance among the cells of the power electronics multilevel converter comprise:

reducing size and cost of components (no oversizing needed);
reducing an overall size and cost of the converter;
simplifying a primary (MV) side of the converter structure for insulation and control;
simplifying a thermal design of the converter structure;
reducing a use of expensive isolated signals for control (i.e. optical communications etc.); and
maintaining a simplicity of the SRC solution.

According to an implementation of the first aspect of the present disclosure, the closed-loop control of the respective cell may further be configured to establish the cell power reference in dependence of a cell energy proportional term depending on the cell voltage, and in dependence of a cell energy proportional reference term depending on the cell voltage reference.

According to an implementation of the first aspect of the present disclosure, the closed-loop control of the respective cell may further be configured to establish the cell voltage reference in dependence of a nominal cell voltage reference of the plurality of cells of the respective phase leg and a cell voltage reference deviation; and establish the cell voltage reference deviation in dependence of the cell power reference deviation.

According to an implementation of the first aspect of the present disclosure, the closed-loop control of the respective cell may further be configured to establish the cell voltage reference deviation in dependence of an equalization transfer function and the cell power reference deviation.

According to an implementation of the first aspect of the present disclosure, the closed-loop control of the respective cell may further be configured to establish the average power per cell in dependence of the cell power references of the plurality of cells of all phase legs, a total count of the plurality of cells per phase leg, and a total count of the one or more phase legs; and to establish the cell power reference deviation in dependence of the cell power reference and the average power per cell.

A second aspect of the present disclosure provides a method of operating a power electronics multilevel converter. The power electronics multilevel converter comprises one or more phase legs. Each respective phase leg of the one or more phase legs comprises a plurality of cells. Each respective cell of the plurality of cells comprises an AC/DC converter, a closed-loop control and a DC/DC converter. The AC/DC converter is configured to transmit a cell power from an input port to a DC link of the respective cell. The DC link comprises an equivalent capacitor that defines a cell voltage. The closed-loop control is configured to regulate the cell power transmitted by the AC/DC converter to the DC link of the respective cell in accordance with a cell power reference. The cell power reference depends on a cell voltage reference. The DC/DC converter is configured to transmit the cell power from the DC link to an output port of the respective cell. The method comprises connecting the input ports of the plurality of cells of the respective phase leg in series between the corresponding AC phase and the neutral point of the AC grid. The method further comprises connecting the output ports of the plurality of cells of all phase legs in parallel to at least one common DC bus. The method further comprises the respective cell adjusting the cell voltage reference in dependence of a cell power reference deviation from an average power per cell. The average power per cell depends on the cell power references of the plurality of cells of all phase legs. The method further comprises the respective cell regulating the cell power transmitted by the AC/DC converter to the DC link of the respective cell in accordance with the cell power reference. The method further comprises the respective cell transmitting the cell power from the input port to the DC link of the respective cell. The method further comprises the respective cell transmitting the cell power from the DC link to the output port of the respective cell.

According to an implementation of the second aspect of the present disclosure, the method may be performed by the power electronics multilevel converter of the first aspect or any of its implementations.

Thereby, the effects and associated advantages mentioned in connection with the power electronics multilevel converter of the first aspect or any of its implementations also apply in connection with the method according to the second aspect by analogy.

A third aspect of the present disclosure provides a computer program comprising a program code for carrying out the method of the second aspect or any of its implementations when implemented on a processor of the power electronics multilevel converter of the first aspect or any of its implementations.

It has to be noted that all devices, elements, units and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects will be explained in the following description of various embodiments in relation to the enclosed drawings.

DETAILED DESCRIPTION OF EMBODIMENTS

Figure 1:
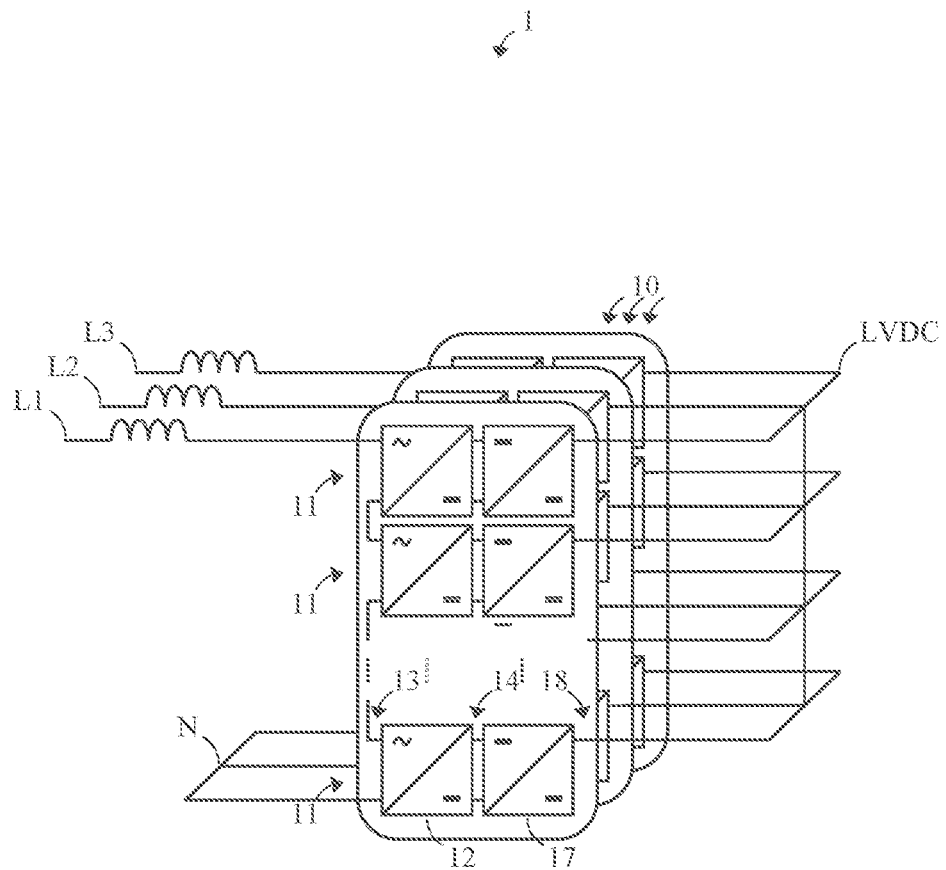
FIG. 1 illustrates a power electronics multilevel converter according to an embodiment of the present disclosure.

The above described aspects will now be described with respect to various embodiments illustrated in the enclosed drawings.

The features of these embodiments may be combined with each other unless specified otherwise. Mere explanation of a feature in connection with a specific embodiment does not constitute that the feature is essential for this embodiment.

The drawings are to be regarded as being schematic representations and elements illustrated in the drawings are not necessarily shown to scale. Rather, the various elements are represented such that their function and general purpose become apparent to a person skilled in the art.

FIG. 1 illustrates a power electronics multilevel converter 1 according to an embodiment of the present disclosure.

The power electronics multilevel converter 1 may comprise an SST. An SST as used herein may refer to a type of electric power converter that is based on power electronics switching, in particular using solid-state power switches such as insulated-gate bipolar transistors (IGBTs) and/or metal-oxide-semiconductor field-effect transistors (MOSFETs). The power electronics multilevel converter 1 of FIG. 1 comprises an SST.

The power electronics multilevel converter 1 comprises one or more (i.e., $1 \leq q \leq Q$) phase legs 10, q. For example, a total count Q of the one or more phase legs 10, q may comprise three, in accordance with the power electronics multilevel converter 1 of FIG. 1. That is, for each AC phase L1, L2, L3 there may be a corresponding phase leg 10, q.

The power electronics multilevel converter 1 may be composed of a plurality of identical but individually controllable power conversion modules or cells 11, m. Each respective phase leg 10, q of the one or more phase legs 10, q comprises a plurality (i.e., $1 \leq m \leq M$) of cells 11, m. For example, a total count M of the plurality of cells 11, m per phase leg 10, q may comprise 10, in accordance with a ratio of a MV rating of the respective phase leg 10, q and an LV rating of the respective cell 11, m.

Figure 2:
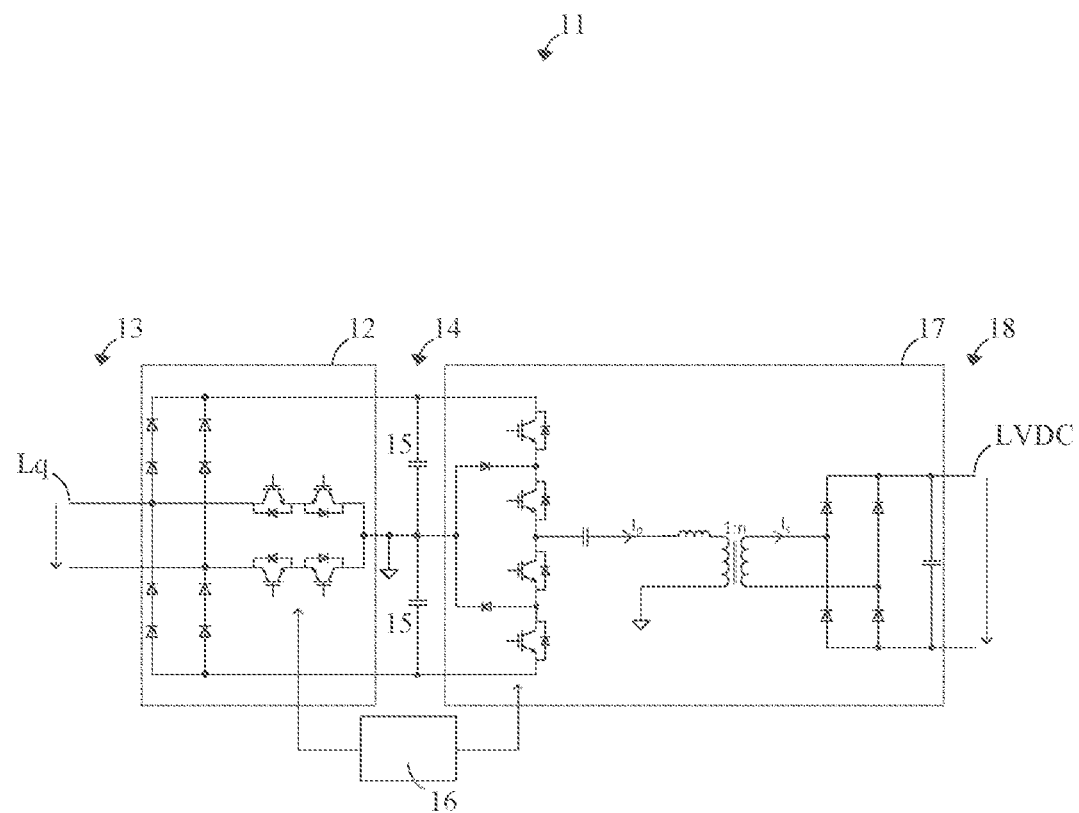
FIG. 2 illustrates a cell of a phase leg of the power electronics multilevel converter of FIG. 1.

In accordance with FIGS. 1 and 2, each respective cell 11, m of the plurality of cells 11, m comprises an AC/DC converter 12, a closed-loop control 16 and a DC/DC converter 17.

In accordance with FIGS. 1 and 2, the AC/DC converter 12 is configured to transmit a cell power 200, $p_{qm}(kT)$ from an input port 13 to the DC link 14 of the respective cell 11, m.

In accordance with FIG. 2, the DC link 14 comprises an equivalent capacitor 15 that defines a cell voltage 201, $v_{dc,qm}(kT)$.

In accordance with FIGS. 1 and 2, the DC/DC converter 17 is configured to transmit the cell power 200, $p_{qm}(kT)$ from the DC link 14 to an output port 18 of the respective cell 11, m.

The power electronics multilevel converter 1 is an ISOP topology. An ISOP topology as used herein may refer to a multilevel and modular topology in which the plurality of cells 11, m have their input ports 13 connected in series and their output ports 18 connected in parallel, in accordance with the power electronics multilevel converter 1 of FIG. 1.

That is, the input ports 13 of the plurality of cells 11, m of a respective phase leg 10, q are connectable in series between a corresponding AC phase L1, L2, L3 and a neutral point N of an AC grid, and the output ports 18 of the plurality of cells 11, m of all phase legs 10, q are connectable in parallel to at least one common DC bus LVDC.

In practice, all the output ports 18 of the plurality of cells 11, m of all phase legs 10, q may be connected to the same LV DC grid thanks to the galvanic isolation provided by the respective cell 11, m (see FIG. 2).

The closed-loop control 16 is configured to regulate the afore-mentioned cell power 200, $p_{qm}(kT)$ transmitted by the AC/DC converter 12 to the DC link 14 of the respective cell 11, m in accordance with a cell power reference 202, $p_{qm}^{ref}(kT)$.

In accordance with FIG. 3 and as explained in more detail in connection with FIG. 2, the cell power reference 202, $p_{qm}^{ref}(kT)$ depends on a cell voltage reference 203, $v_{dc,qm}^{ref}(kT)$.

The closed-loop control 16 of the respective cell 11, m is configured to adjust 308 the cell voltage reference 203, $v_{dc,qm}^{ref}(kT)$ in dependence of a cell power reference deviation 204, $\Delta p_{qm}^{ref}(kT)$ from an average power per cell 205, $p_{QM}(kT)$.

This average power per cell 205, $p_{QM}(kT)$ in turn depends on the cell power references 202, $p_{qm}^{ref}(kT)$ of the plurality of cells 11, m of all phase legs 10, q.

In other words, the operating principle of the closed-loop control 16 may be summarized as follows:

Ideally, the cell powers 200, $p_{qm}(kT)$ of the plurality of cells 11, m of all phase legs 10, q are the same. That is, they correspond to a nominal or average power per cell 205, $p_{QM}(kT)$. In absence of any transients, this average power per cell 205, $p_{QM}(kT)$ may be determined by evaluation of the cell power references 202, $p_{qm}^{ref}(kT)$ of the plurality of cells 11, m of all phase legs 10, q.

But realistically, component tolerances may give rise to a tolerance-related power imbalance among the plurality of cells 11, m of all phase legs 10, q.

In other words, a cell power reference 202, $p_{qm}^{ref}(kT)$ (and a corresponding cell power 200, $p_{qm}(kT)$) of a respective cell 11, m of a respective phase leg 10, q may differ from the average power per cell 205, $p_{QM}(kT)$ by a corresponding cell power reference deviation 204, $\Delta p_{qm}^{ref}(kT)$.

This deviation 204, $\Delta p_{qm}^{ref}(kT)$ from the average power per cell 205, $p_{QM}(kT)$ may be used to adjust 308 the cell voltage reference 203, $v_{dc,qm}^{ref}(kT)$ of the respective cell 11, m of the respective phase leg 10, q.

The adjusted cell voltage reference (of the previous control sample) 203, $v_{dc,qm}^{ref}((k-1)T)$ may in turn be used to adjust the cell power reference (of the current control sample) 202, $p_{qm}^{ref}(kT)$ (and thus the corresponding cell power 200, $p_{qm}(kT)$) depending thereon of the respective cell 11, m of the respective phase leg 10, q.

As a result, the cell powers 200, $p_{qm}(kT)$ of the plurality of cells 11, m of all phase legs 10, q become the same, as is explained next in more detail, and any tolerance-related power imbalance is levelled out, which yields the advantages mentioned above.

FIG. 2 illustrates a cell 11, m of a phase leg 10, q of the power electronics multilevel converter 1 of FIG. 1.

The depicted cell 11, m comprises an AC/DC converter 12, a DC link 14, a DC/DC converter 17 and a control unit comprising a closed-loop control 16.

According to FIG. 2, the AC/DC converter 12 comprises, from left to right (i.e., from an input port 13 connected to an AC phase $L_q$ to a DC link 14 of the cell 11, m), an AC/DC unity power rectifier formed of diodes in a full-bridge scheme in combination with a plurality of active switches. The control unit is configured to actuate the power switches of the AC/DC converter 12 in accordance with the closed-loop control 16 so as to transmit a cell power 200, $p_{qm}(kT)$ from the input port 13 to the DC link 14 of the cell 11, m. The DC link 14 comprises an equivalent capacitor 15 that defines a cell voltage 201, $v_{dc,qm}(kT)$ of the cell 11, m.

According to FIG. 2, the SRC DC/DC converter 17 comprises, from left to right (i.e., from the DC link 14 to an output port 18 of the cell 11, m connected to a common DC bus LVDC), a three-level neutral point clamped DC/AC branch, a resonant tank circuit, a high/medium frequency transformer that provides galvanic isolation and, finally, an AC/DC full-bridge diode rectifier circuit.

An SRC as used herein may refer to a resonant converter in which a resonant circuit (or "resonant tank") comprises serially connected inductors and capacitors.

The SRC is formed of a plurality of power switches and a resonant circuit formed of a capacitor and an inductor connected in series. If a primary inductance of a subsequent transformer is considered as part of the resonant circuit, too, the resonant circuit may be seen as being formed of an LLC resonant network. Other topologies relying on resonant operation may be deployed, too.

The use of diodes in the secondary rectifier of the DC/DC converter 17 permits a more compact and cost-effective design in data center applications, but implies unidirectional operation. Without any loss of generality, a bidirectional DC/DC converter can be used.

The control unit is configured to actuate the power switches of the SRC in accordance with an open-loop control (operating in constant duty cycle, e.g., 50%) so as to transmit the cell power 200, $p_{qm}(kT)$ from the DC link 14 to the output port 18 of the cell 11, m. This means that the cell power 200, $p_{qm}(kT)$ of the respective cell 11, m of the respective phase leg 10, q is a function of the load on the LVDC side.

Assuming all cells to be equal and regulated to the same DC link voltage, an equal distribution of the cell powers 200, $p_{qm}(kT)$ transmitted from the MV AC grid to the LVDC grid would be achieved naturally.

However, physical reality of an industrial application means that discrepancies (tolerances) exist among components (inductors, capacitors, transformers, sensors, etc.), which creates an uneven power distribution among the cells of an SST.

Assuming that the load on the LVDC side establishes a fixed, constant voltage for the multitude of cells 11, m connected to the common DC bus LVDC, the AC/DC converters 12 appear as slightly different DC sources to the common LV DC grid, and there is a directly proportional small-signal relation between the cell power 200, $p_{qm}(dc)$ and the cell voltage 201, $v_{dc,qm}(dc)$ of the respective cell 11, m of the respective phase leg 10, q, i.e.

$$\Delta p_{qm}(dc) = K_{qm} \cdot \Delta v_{dc,qm}(dc) \quad (1)$$

wherein (dc) means that this expression refers to the DC (i.e., zero-frequency) component and $K_{qm}$ is a constant term that depends on the physical parameters of each cell 11, m (that is, real value of capacitors, inductors, transformer parameters, sensors gains, etc.). Assuming such discrepancies among all the cells 11, m, it can be stated without loss of generality that all $K_{qm}$ values are quite similar in practice (e.g., no more than 20% deviation should be expected in practice). Therefore, a continuous-time expression $$\Delta p_{qm}(s) = K_{qm} \cdot \Delta v_{dc,qm}(s) \quad (2)$$

can be assumed as the plant, wherein a frequency domain is expressed by the Laplace term s=jω, and evaluation of eqn. (2) at ω=0 yields eqn. (1), whereas discrete-time domain equivalent expressions are represented by using the variable kT, instead.

According to the nature of the problem, each of the cells has to act locally (distributed, not centralized control). Each cell's controller calculates the cell power 200, $p_{qm}(kT)$ to be absorbed from the MV AC grid in order to keep its cell voltage 201, $v_{dc,qm}(kT)$ at its cell voltage reference 203, $v_{dc,qm}{}^{ref}(kT)$. Notably, the cell voltage reference 203, $v_{dc,qm}{}^{ref}(kT)$ is made time dependent on purpose: it may be changed as a function of the overall control purpose. The plurality of cell voltage references 203, $v_{dc,qm}{}^{ref}(kT)$ may be shaped to fulfil a power sharing objective.

Without any loss of generality, the cell voltage reference 203, $v_{dc,qm}{}^{ref}(kT)$ can be written as a sum of a constant nominal cell voltage reference 209, $V_{dc}{}^{ref}$ common to all the cells 11, m plus a cell voltage reference deviation 210, $\Delta v_{dc,qm}{}^{ref}(kT)$ that will depend on the power sharing control; i.e., $$v_{dc,qm}{}^{ref}(kT) = V_{dc}{}^{ref} + \Delta v_{dc,qm}{}^{ref}(kT) \quad (3)$$

The nominal cell voltage reference 209, $V_{dc}{}^{ref}$ can be ignored for closed-loop controller design, as the control action applies only for the delta term, i.e., the cell voltage reference deviation ref 210, $\Delta v_{dc,qm}{}^{ref}(kT)$. Therefore, the control action that provides dynamic balancing is of the form $$\Delta v_{dc,qm}{}^{ref,eq}(kT) = -K_{eq}(kT) \Delta p_{qm}{}^{ref}(kT) \quad (4)$$

where $K_{eq}(kT)$ is a transfer function that includes a gain and low-pass filtering (to add band limitation), and $\Delta p_{qm}{}^{ref}(kT)$ is a deviation 204, $\Delta p_{qm}{}^{ref}(kT)$ of the cell power reference 202, $p_{qm}{}^{ref}(kT)$ from the average power per cell 205, $p_{QM}(kT)$, calculated as $$\Delta p_{qm}{}^{ref}(kT) = p_{qm}{}^{ref}(kT) - p_{QM}(kT) \quad (5)$$

$$p_{QM}(kT) = \frac{1}{QM} \sum_{\substack{q=a,b,c \\ m=1,\ldots,M}} p_{qm}^{ref}(kT) \quad (6)$$

The negative sign in eqn. (4) has an important physical meaning: a delta increment in the deviation 204, $\Delta p_{qm}{}^{ref}(kT)$ creates a delta decrease in the cell voltage reference deviation 210, $\Delta v_{dc,qm}{}^{ref}(kT)$, and vice versa. The tuning of the system is the choice of parameters for $K_{eq}(kT)$; overall: i) the DC gain and ii) the cut-off frequency of the low pass filter behaviour.

This digital equalization is implemented digitally and bandlimited, only relies on local measurements of the cell(s), and sets different individual cell voltages 201, $v_{dc,qm}(kT)$ to achieve an equal power sharing of the SST.

Figure 3:
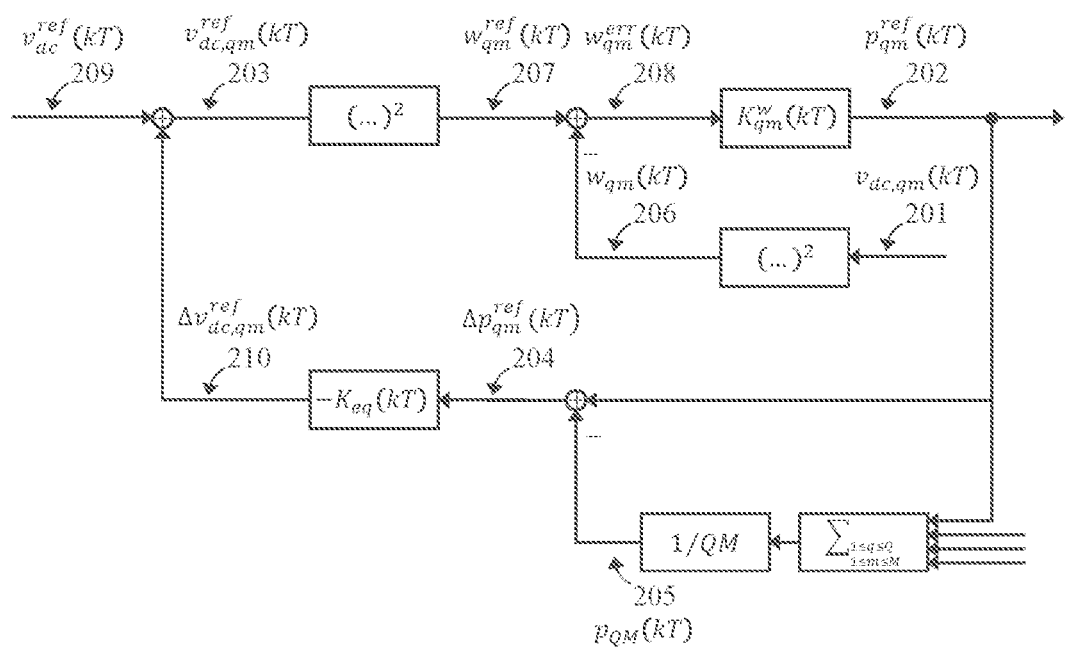
FIG. 3 illustrates a portion of a closed-loop control of the power electronics multilevel converter of FIG. 1.

FIG. 3 illustrates a portion of a closed-loop control 16 of the power electronics multilevel converter 1 of FIG. 1.

The underlying power electronics multilevel converter 1 comprises one or more (i.e., 1≤q≤Q) phase legs 10, q. Each respective phase leg 10, q of the one or more phase legs 10, q comprises a plurality 1≤m≤M of cells 11, m. Each respective cell 11, m of the plurality of cells 11, m comprises an AC/DC converter 12, a closed-loop control 16 and a DC/DC converter 17. The AC/DC converter 12 is configured to transmit a cell power 200, $p_{qm}(kT)$ from an input port 13 to a DC link 14 of the respective cell 11, m. The DC link 14 comprises an equivalent capacitor 15 that defines a cell voltage 201, $v_{dc,qm}(kT)$. The DC/DC converter 17 is configured to transmit the cell power 200, $p_{qm}(kT)$ from the DC link 14 to an output port 18 of the respective cell 11, m. The input ports 13 of the plurality of cells 11, m of a respective phase leg 10, q are connectable in series between a corresponding AC phase L1, L2, L3 and a neutral point N of an AC grid. The output ports 18 of the plurality of cells 11, m of all phase legs 10, q are connectable in parallel to at least one common DC bus LVDC.

The closed-loop control 16 is configured to regulate the cell power 200, $p_{qm}(kT)$ transmitted by the AC/DC converter 12 to the DC link 14 of the respective cell 11, m in accordance with a cell power reference 202, $p_{qm}{}^{ref}(kT)$.

The portion of the closed-loop control 16 that will be described in the following is particularly concerned with provision of the cell power reference 202, $p_{qm}{}^{ref}(kT)$ according to which the cell power 200, $p_{qm}{}^{ref}(kT)$ can be regulated by the closed-loop control 16.

The description is carried out around the control circuit in a counter-clockwise direction, starting and ending with the cell power reference 202, $p_{qm}{}^{ref}(kT)$ at the top right of FIG. 3.

The closed-loop control 16 of the respective cell 11, m may be configured to establish 307 the cell power reference 202, $p_{qm}{}^{ref}(kT)$ in dependence of a cell energy proportional term 206, Kim (kT) depending on the cell voltage 201, $v_{dc,qm}(kT)$, and in dependence of a cell energy proportional reference term 207, $w_{qm}{}^{ref}(kT)$ depending on the cell voltage reference 203, $v_{dc,qm}{}^{ref}(kT)$.

As can be seen, the cell power reference 202, $p_{qm}{}^{ref}(kT)$ depends on a cell voltage reference 203, $v_{dc,qm}{}^{ref}(kT)$ (see also eqns. (1), (2) above).

The closed-loop control 16 of the respective cell 11, m may further be configured to establish 306 the cell voltage reference 203, $v_{dc,qm}{}^{ref}(kT)$ in dependence of a nominal cell voltage reference 209, $V_{dc}{}^{ref}$ of the plurality of cells 11, m of the respective phase leg 10, q and a cell voltage reference deviation 210, $\Delta v_{dc,qm}{}^{ref}(kT)$; and to establish 305 the cell voltage reference deviation 210, $\Delta v_{dc,qm}{}^{ref}(kT)$ in dependence of a cell power reference deviation 204, $\Delta p_{qm}{}^{ref}(kT)$.

The closed-loop control 16 of the respective cell 11, m may further be configured to establish 305 the cell voltage reference deviation 210, $\Delta v_{dc,qm}{}^{ref}(kT)$ in dependence of an equalization transfer function $K_{eq}(kT)$ and the cell power reference deviation 204, $\Delta p_{qm}^{ref}(kT)$.

The closed-loop control 16 of the respective cell 11, m is further configured to adjust 308 the cell voltage reference 203, $v_{dc,qm}^{ref}(kT)$ in dependence of the cell power reference deviation 204, $\Delta p_{qm}^{ref}(kT)$ from an average power per cell 205, $p_{QM}(kT)$. In turn, the average power per cell 205, $p_{QM}(kT)$ depends on the cell power references 202, $p_{qm}^{ref}(kT)$ of the plurality of cells 11, m of all phase legs 10, q.

The closed-loop control 16 of the respective cell 11, m may further be configured to establish 303 the average power per cell 205, $p_{QM}(kT)$ in dependence of the cell power references 202, $p_{qm}^{ref}(kT)$ of the plurality of cells 11, m of all phase legs 10, q, a total count M of the plurality of cells 11, m per phase leg 10, q, and a total count Q of the one or more phase legs 10, q; and to establish 304 the cell power reference deviation 204, $\Delta p_{qm}^{ref}(kT)$ in dependence of the cell power reference 202, $p_{qm}^{ref}(kT)$ and the average power per cell 205, $p_{QM}(kT)$.

Figure 4:
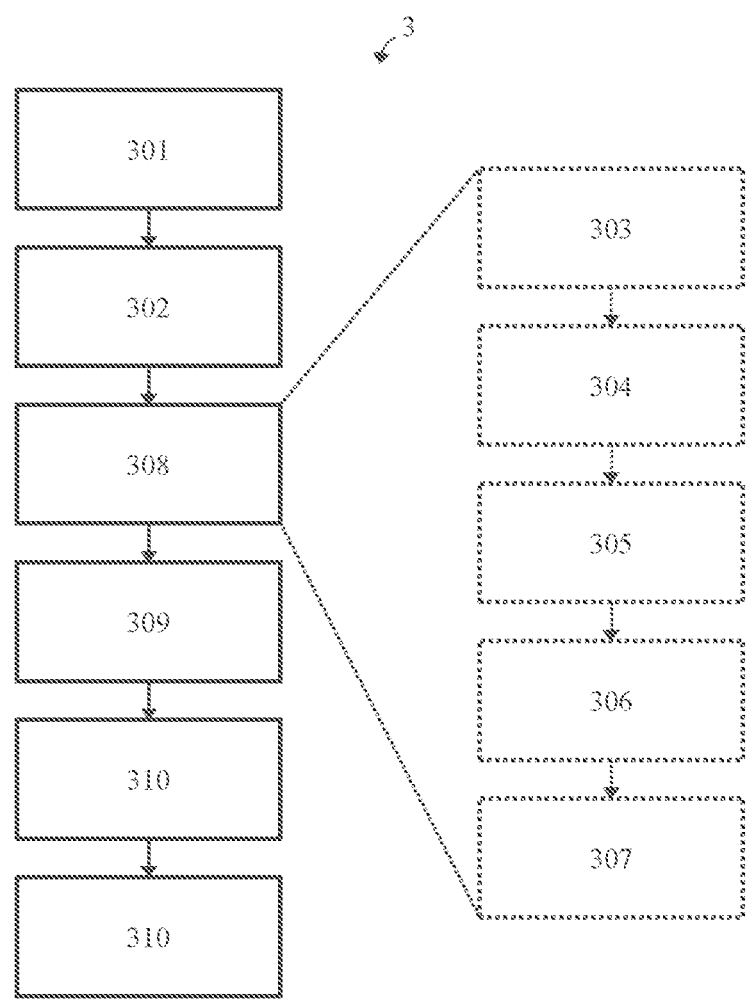
FIG. 4 illustrates a flow diagram of a method according to an embodiment of the present disclosure of operating the power electronics multilevel converter of FIG. 1.

FIG. 4 illustrates a flow diagram of a method 3 according to an embodiment of the present disclosure of operating the power electronics multilevel converter 1 of FIG. 1.

The method 3 comprises a step of connecting 301 the input ports 13 of the plurality of cells 11, m of the respective phase leg 10, q in series between the corresponding AC phase L1, L2, L3 and the neutral point N of the AC grid.

The method 3 further comprises a step of connecting 302 the output ports 18 of the plurality of cells 11, m of all phase legs 10, q in parallel to at least one common DC bus LVDC.

The method 3 further comprises a step of the respective cell 11, m adjusting 308 the cell voltage reference 203, $v_{dc,qm}^{ref}(kT)$ in dependence of a cell power reference deviation 204, $\Delta p_{qm}^{ref}(kT)$ from an average power per cell 205, $p_{QM}(kT)$. The average power per cell 205, $p_{QM}(kT)$ depends on the cell power references 202, $p_{qm}^{ref}(kT)$ of the plurality of cells 11, m of all phase legs 10, q.

The step of adjusting 308 may be made more concrete by one or more of the following optional steps (illustrated as dotted in FIG. 4):

The adjusting 308 the cell voltage reference 203, $v_{dc,qm}^{ref}(kT)$ may comprise a step of establishing 303 the average power per cell 205, $p_{QM}(kT)$ in dependence of the cell power references 202, $p_{qm}^{ref}(kT)$ of the plurality of cells 11, m of all phase legs 10, q, a total count M of the plurality of cells 11, m per phase leg 10, q, and a total count Q of the one or more phase legs 10, q.

The adjusting 308 the cell voltage reference 203, $v_{dc,qm}^{ref}(kT)$ may further comprise a step of establishing 304 the cell power reference deviation 204, $\Delta p_{qm}^{ref}(kT)$ in dependence of the cell power reference 202, $p_{qm}^{ref}(kT)$ and the average power per cell 205, $p_{QM}(kT)$.

The adjusting 308 the cell voltage reference 203, $v_{dc,qm}^{ref}(kT)$ may further comprise a step of establishing 305 the cell voltage reference deviation 210, $\Delta v_{dc,qm}^{ref}(kT)$ in dependence of ref the cell power reference deviation 204, $\Delta p_{qm}^{ref}(kT)$, particularly by establishing 305 the cell voltage ref reference deviation 210, $\Delta V_{dc,qm}^{ref}(kT)$ in dependence of an equalization transfer function $K_{eq}(kT)$ and the cell power reference deviation 204, $\Delta p_{qm}^{ref}(kT)$.

The adjusting 308 the cell voltage reference 203, $v_{dc,qm}^{ref}(kT)$ may further comprise a step of establishing 306 the cell voltage reference 203, $v_{dc,qm}^{ref}(kT)$ in dependence of a nominal cell voltage reference 209, $V_{dc}^{ref}$ of the plurality of cells 11, m of the respective phase leg 10, q and a cell voltage reference deviation 210, $\Delta v_{dc,qm}^{ref}(kT)$.

The adjusting 308 the cell voltage reference 203, $v_{dc,qm}^{ref}(kT)$ may further comprise a step of establishing 307 the cell power reference 202, $p_{qm}^{ref}(kT)$ in dependence of a cell energy proportional term 206, $w_{qm}(kT)$ depending on the cell voltage 201, $v_{dc,qm}(kT)$, and in dependence of a cell energy proportional reference term 207, $w_{qm}^{ref}(kT)$ depending on the cell voltage reference 203, $v_{dc,qm}^{ref}(kT)$.

The method 3 further comprises a step of the respective cell 11, m regulating 309 the cell power 200, $p_{qm}(kT)$ transmitted by the AC/DC converter 12 to the DC link 14 of the respective cell 11, m in accordance with the cell power reference 202, $p_{qm}^{ref}(kT)$.

The method 3 further comprises a step of the respective cell 11, m transmitting 310 the cell power 200, $p_{qm}(kT)$ from the input port 13 to the DC link 14 of the respective cell 11, m.

The method 3 further comprises a step of the respective cell 11, m transmitting 311 the cell power 200, $p_{qm}(kT)$ from the DC link 14 to the output port 18 of the respective cell 11, m.

According to an implementation of the second aspect of the present disclosure, the method 3 may be performed by the power electronics multilevel converter 1 of the first aspect or any of its implementations.

Figure 5:
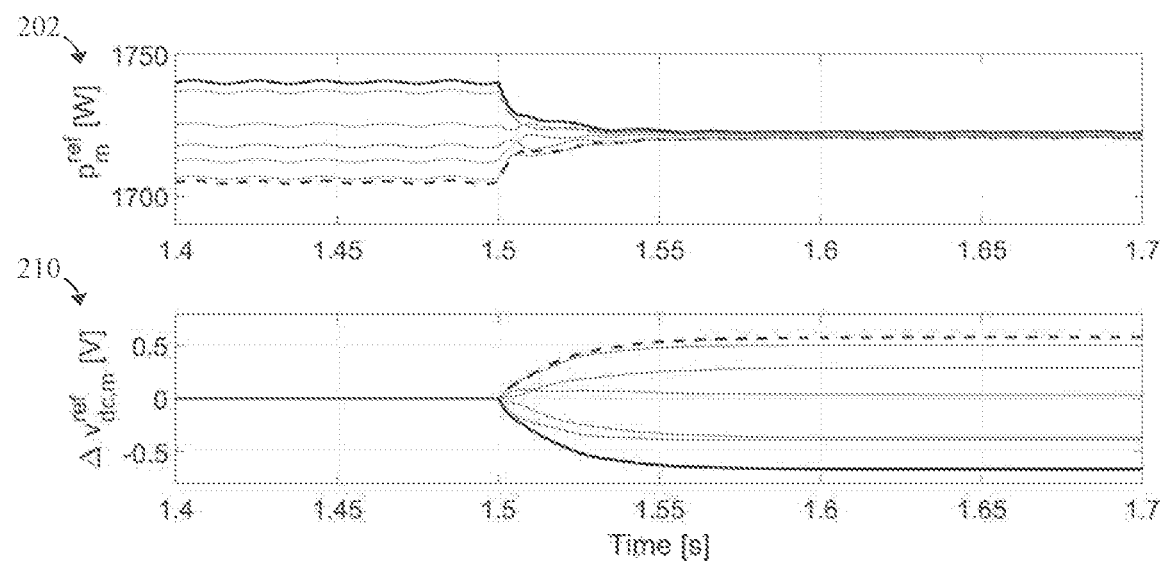
FIG. 5 illustrates a performance of an exemplary power electronics multilevel converter.

FIG. 5 illustrates a performance of an exemplary power electronics multilevel converter 1.

The underlying converter 1 is modelled as comprising a single (Q=1) phase leg 10, q (the subscript "q" is thus removed) and a plurality (M=7) of cells 11, m based on PLECS software.

Component tolerances have been established by using a random generator. A 12 kilowatt (kW) load plus losses is assumed in the LVDC grid, so that a value of around 1720 W per cell is the optimal power sharing. At 1.5 seconds the power sharing is activated. Evidently, after remission of the transients all the cells transmit a power very close to the optimum. The waveforms in the limits are highlighted (thick curves, one solid, one dashed) in order to show the influence of the sign (physical meanings) in eqn. (4).

The processor or processing circuitry of the power electronics multilevel converter 1 may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable gate arrays (FPGAs), digital signal processors (DSPs), or multi-purpose processors.

The power electronics multilevel converter 1 may further comprise memory circuitry, which stores one or more instruction(s) that can be executed by the processor or by the processing circuitry, in particular under control of the software. For instance, the memory circuitry may comprise a non-transitory storage medium (not shown) storing executable program code which, when executed by the processor or the processing circuitry, causes the method 80 according to the second aspect or any of its embodiments to be performed.

The present disclosure has been described in conjunction with various embodiments as examples as well as implementations. However, other variations can be understood and effected by those persons skilled in the art and practicing the claimed subject-matter, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. An apparatus, comprising:
one or more phase legs, wherein each of the one or more phase legs comprises:
a plurality of cells, wherein each of the plurality of cells comprises:
an alternating current (AC)/direct current (DC) converter comprising an input port configured to transmit cell power;
a DC link coupled to the AC/DC converter, configured to receive the cell power from the AC/DC converter, and comprising an equivalent capacitor that defines a cell voltage;
a closed-loop control configured to regulate, in accordance with a cell power reference, the cell power, wherein the cell power reference depends on a cell voltage reference; and
a DC/DC converter coupled to the DC link, configured to receive the cell power from the DC link, and comprising an output port configured to transmit the cell power;
wherein the input ports of the plurality of cells in each of the one or more phase legs are connected in series between an AC phase and a neutral point (N) of an AC grid,
wherein the output ports of the plurality of cells in each of the one or more phase legs are connected in parallel to at least one common DC bus (LVDC),
wherein the closed-loop control in each of the plurality of cells is configured to adjust the cell voltage reference in dependence of a cell power reference deviation from an average power per cell, and
wherein the average power per cell depends on the cell power reference of the plurality of cells in the one or more phase legs.

2. The apparatus of claim 1, wherein the closed-loop control in each of the plurality of cells is further configured to establish the cell power reference in dependence of a cell energy proportional term and a cell energy proportional reference term, wherein the cell energy proportional term depends on the cell voltage, and wherein the cell energy proportional reference term depends on the cell voltage reference.

3. The apparatus of claim 2, wherein the closed-loop control in each of the plurality of cells is further configured to:
establish the cell voltage reference in dependence of a nominal cell voltage reference of the plurality of cells in one of the one or more phase legs and a cell voltage reference deviation; and
establish the cell voltage reference deviation in dependence of the cell power reference deviation.

4. The apparatus of claim 3, wherein the closed-loop control in each of the plurality of cells is further configured to establish the cell voltage reference deviation in dependence of an equalization transfer function and the cell power reference deviation.

5. The apparatus of claim 3, wherein the closed-loop control in each of the plurality of cells is further configured to:
establish the average power per cell in dependence of the cell power references of the plurality of cells in the one or more phase legs, a first total count of the plurality of cells in each of the one or more phase legs, and a second total count of the one or more phase legs; and
establish the cell power reference deviation in dependence of the cell power reference and the average power per cell.

6. The apparatus of claim 1, wherein the plurality of cells comprises a solid-state transformer (SST).

7. The apparatus of claim 1, wherein the plurality of cells comprises an insulated-gate bipolar transistor (IGBT).

8. The apparatus of claim 1, wherein the plurality of cells comprises a metal-oxide-semiconductor field-effect transistor (MOSFET).

9. The apparatus of claim 1, wherein the apparatus is implemented by a power electronics multilevel converter.

10. The apparatus of claim 1, wherein the apparatus is implemented by power electronics switching.

11. A method, comprising:
connecting input ports for each of a plurality of cells in each of one or more phase legs in series between an alternating current (AC) phase and a neutral point (N) of an AC grid;
connecting output ports for each of the plurality of cells in each of the one or more phase legs in parallel to at least one common direct current (DC) bus (LVDC);
adjusting, for each of the plurality of cells, a cell voltage reference in dependence of a cell power reference deviation from an average power per cell, wherein the average power per cell depends on cell power references of the plurality of cells in the one or more phase legs;
regulating, for each of the plurality of cells, cell power transmitted by an AC/DC converter to a DC link in accordance with the cell power references;
transmitting, for each of the plurality of cells, the cell power from an input port to the DC link; and
transmitting, for each of the plurality of cells, the cell power from the DC link to an output port.

12. The method of claim 11, further comprising establishing the cell power references in dependence of a cell energy proportional term and a cell energy proportional reference term, wherein the cell energy proportional term depends on a cell voltage, and wherein the cell energy proportional reference term depends on the cell voltage reference.

13. The method of claim 12, further comprising:
establishing the cell voltage reference in dependence of a nominal cell voltage reference of the plurality of cells in one of the one or more phase legs and a cell voltage reference deviation; and
establishing the cell voltage reference deviation in dependence of the cell power reference deviation.

14. The method of claim 13, further comprising establishing the cell voltage reference deviation in dependence of an equalization transfer function and the cell power reference deviation.

15. The method of claim 13, further comprising:
establishing the average power per cell in dependence of the cell power references of the plurality of cells in the one or more phase legs, a first total count of the plurality of cells in each of the one or more phase legs, and a second total count of the one or more phase legs; and
establishing the cell power reference deviation in dependence of the cell power references and the average power per cell.

16. A non-transitory computer readable medium comprising instructions that, when executed by one or more processors, cause an apparatus to:
- connect input ports for each of a plurality of cells in each of one or more phase legs in series between an alternating current (AC) phase and a neutral point (N) of an AC grid;
- connect output ports for each of the plurality of cells in each of the one or more phase legs in parallel to at least one common direct current (DC) bus (LVDC);
- adjust, for each of the plurality of cells, a cell voltage reference in dependence of a cell power reference deviation from an average power per cell, wherein the average power per cell depends on cell power references of the plurality of cells in the one or more phase legs;
- regulate, for each of the plurality of cells, cell power transmitted by an AC/DC converter to a DC link in accordance with the cell power references;
- transmit, for each of the plurality of cells, the cell power from an input port to the DC link; and
- transmit, for each of the plurality of cells, the cell power from the DC link to an output port.

17. The non-transitory computer readable medium of claim 16, wherein the one or more processors are further configured to execute the instructions to establish the cell power references in dependence of a cell energy proportional term and a cell energy proportional reference term, wherein the cell energy proportional term depends on a cell voltage, and wherein the cell energy proportional reference term depends on the cell voltage reference.

18. The non-transitory computer readable medium of claim 17, wherein the one or more processors are further configured to execute the instructions to:
- establish the cell voltage reference in dependence of a nominal cell voltage reference of the plurality of cells in one of the one or more phase legs and a cell voltage reference deviation; and
- establish the cell voltage reference deviation in dependence of the cell power reference deviation.

19. The non-transitory computer readable medium of claim 18, wherein the one or more processors are further configured to execute the instructions to establish the cell voltage reference deviation in dependence of an equalization transfer function and the cell power reference deviation.

20. The non-transitory computer readable medium of claim 18, wherein the one or more processors are further configured to execute the instructions to:
- establish the average power per cell in dependence of the cell power references of the plurality of cells in the one or more phase legs, a first total count of the plurality of cells in each of the one or more phase legs, and a second total count of the one or more phase legs; and
- establish the cell power reference deviation in dependence of the cell power references and the average power per cell.

* * * * *